(12) United States Patent
Magee (10) Patent No.: US 11,370,285 B2
(45) Date of Patent: Jun. 28, 2022

(54) ANTI-ICING AND ULTRAVIOLET REFLECTIVE APPARATUS FOR VEHICLE WINDSHIELDS AND WINDOWS

(71) Applicant: Florida A&M University, Tallahassee, FL (US)

(72) Inventor: Charles Magee, Cairo, GA (US)

(73) Assignee: Florida A&M University, Tallahassee, FL (US)

( * ) Notice: Subject to any disclaimer, the term of this patent is extended or adjusted under 35 U.S.C. 154(b) by 611 days.

(21) Appl. No.: 16/510,545

(22) Filed: Jul. 12, 2019

(65) Prior Publication Data

US 2020/0016968 A1 Jan. 16, 2020

Related U.S. Application Data

(60) Provisional application No. 62/697,626, filed on Jul. 13, 2018.

(51) Int. Cl.
*B60J 11/02* (2006.01)
*B60J 11/08* (2006.01)

(52) U.S. Cl.
CPC .............. *B60J 11/025* (2013.01); *B60J 11/08* (2013.01)

(58) Field of Classification Search
CPC . B60J 11/02; B60J 11/025; B60J 11/04; B60J 11/08
USPC ....... 296/95.1, 98, 136.01, 136.02; 150/168; 160/370.21
See application file for complete search history.

(56) References Cited

U.S. PATENT DOCUMENTS 5,433,499 A * 7/1995 Wu .......................... B60J 11/02
296/136.02

FOREIGN PATENT DOCUMENTS

| KR | 2018069160 A | * | 6/2018 | ................ B60J 1/02 |
| KR | 2018115593 A | * | 10/2018 | .............. B60J 1/002 |
| WO | WO-2012083760 A1 | * | 6/2012 | .............. B60J 11/04 |

* cited by examiner

*Primary Examiner* — Joseph D. Pape
*Assistant Examiner* — Veronica M Shull
(74) *Attorney, Agent, or Firm* — FisherBroyles, LLP (57) ABSTRACT

Various embodiments are directed to an anti-icing and ultra-violet (UV) reflective apparatus for vehicle windshields and windows. The apparatus may include a housing including a hinged door covering interior components contained therein. The components may include a cover component coupled to an interior of the housing that stores a cover for covering a vehicle windshield and vehicle windows and that reflects UV radiation. The components may further include a roller component, coupled to an interior of the housing, that stores a set of rollers in an anti-freezing compound utilized for coating the cover. The components may also include a turning mechanism coupled to the cover component through an exterior side of the housing that extends the cover onto the vehicle windshield and/or the vehicle windows to protect the at least one of the vehicle windshield and the one or more vehicle windows against freezing and the UV radiation.

20 Claims, 7 Drawing Sheets

ANTI-ICING AND ULTRAVIOLET REFLECTIVE APPARATUS FOR VEHICLE WINDSHIELDS AND WINDOWS

CROSS REFERENCE TO RELATED APPLICATION

This application claims the benefit of U.S. Provisional Application No. 62/697,626, filed Jul. 13, 2018, the disclosure of which is incorporated, in its entirety, by this reference.

BACKGROUND

Owners and operators of personal vehicles as well as company and organizational vehicles (e.g., rental cars, car sharing, and fleet vehicles) located in geographical regions with freezing or below freezing temperatures, may often be faced with the unenviable and time-consuming task of scraping off ice that has formed on vehicle windshields and windows. Additionally, owners and operators of vehicles located in geographical regions with very warm to hot temperatures may be faced with extreme vehicle heating due to the effects of solar radiation which may cause fading and other damage to vehicle interiors.

Traditional solutions for preventing ice from forming on vehicle windshields in cooler regions may include using substances with low freezing points such as oils, grease, cooking lubricants and chemical jellies. However, the application of these substances to vehicle windshields and windows may often be a long and labor-intensive process. For example, it may take an extended period of time for a vehicle owner (e.g., by using a rag or brush) to apply a sufficient amount of an anti-freezing substance to cover all of the windshield and window glass on a single vehicle. This process may be further compounded for rental car or fleet vehicle owners faced with the task of applying these substances to tens or even hundreds of cars that may be parked in a lot at any given time, thereby resulting in potential lost revenue and increased response times (e.g., for emergency vehicles) from not having a sufficient number of cars available for use upon request. Similarly, traditional solutions for mitigating the effects of solar radiation in warmer environments may include the use of portable sunshades, several of which may be needed to cover an entire vehicle, thereby making the application process a time-consuming and tedious process. Moreover, vehicle owners and operators located in and/or travelling to and from geographical regions with freezing and hot temperatures, may be faced with the task of carrying both anti-freezing substances and sunshades to address the effects of both environments on their vehicles at any given time. It is with respect to these considerations and others that the various embodiments of the present invention have been made.

SUMMARY

As will be described in greater detail below, the instant disclosure generally relates to an anti-icing and ultraviolet (UV) reflective apparatus for vehicle windshields and windows. In one example, the apparatus may include (1) a housing including a hinged door that at least partially covers a set of interior components, (2) a cover component coupled to an interior of the housing that stores a cover for covering a vehicle windshield and/or one or more vehicle windows, (3) a roller component, coupled to an interior of the housing, that stores a set of rollers in an anti-freezing compound, and (4) a turning mechanism coupled to the cover component through an exterior side of the housing that extends, in response to an applied torque, the cover from the cover component onto the vehicle windshield and/or the vehicle windows to protect against freezing and UV radiation.

In some examples, the turning mechanism may extend the cover from the cover component by (1) extending the cover through the rollers in the roller component to coat the cover with the anti-freezing compound and (2) extending the cover coated with the anti-freezing compound from the roller component onto the vehicle windshield and/or vehicle windows to protect the vehicle windshield and/or windows against freezing. In one embodiment, the cover may be extended between a top roller and a bottom roller to simultaneously coat a top side and a bottom side of the cover with the anti-freezing compound.

In some embodiments, the turning mechanism may extend the cover from the cover component by extending the cover from the cover component over the roller component and onto the vehicle windshield and/or vehicle windows to protect the vehicle windshield and/or vehicle windows against the UV radiation. In some examples, one or more sides of the cover may reflect the UV radiation.

In some examples, the apparatus may further include a set of security cables that attach between one or more vehicle door frames and a vehicle windshield frame. In one embodiment, the security cables may provide anti-theft functionality by maintaining the cover in place on the vehicle windshield/and or vehicle windows. In one embodiment, the security cables may include a first security cable coupled to the cover and a second security cable coupled to a bottom of the housing.

In some embodiments, the apparatus may further include multiple attachment components that affix the apparatus to at least a portion of a vehicle windshield or one or more vehicle windows. In some examples, the anti-freezing compound may be a chemical substance having a low freezing point.

In some examples, the instant disclosure presents a system that includes an anti-icing and ultraviolet (UV) reflective apparatus with at least one of the features described above. In one example, the system may include a vehicle having a windshield and/or one or more windows for attachment to the apparatus. In other examples, the system may include a windshield or one or more windows for attachment to the apparatus.

In some examples, the instant disclosure presents methods associated with manufacturing, assembling, using, adjusting, or otherwise configuring or creating an anti-icing and ultraviolet (UV) reflective apparatus for vehicle windshields and windows. For example, a method may include (1) coupling a cover component to an interior of a housing, where the housing includes a hinged door for at least partially covering a set of interior components and wherein the cover component stores a cover for covering a vehicle windshield and/or one or more vehicle windows, (2) coupling a roller component to the interior of the housing, where the roller component stores a set of rollers in an anti-freezing compound, and (3) coupling a turning mechanism to the cover component through an exterior side of the housing, where the turning mechanism, in response to an applied torque, extends the cover from the cover component onto the vehicle windshield and/or vehicle windows to protect against freezing and UV radiation.

In some embodiments, the method may further include (1) coupling set of security cables to the cover and the bottom of the housing for attachment between one or more vehicle door frames and a vehicle windshield frame, where the security cable maintains the cover in place on the vehicle windshield/and or one or more vehicle windows and (2) coupling multiple attachment components to a bottom of the housing for affixing the housing to the vehicle windshield or vehicle windows.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

DETAILED DESCRIPTION

The present disclosure is generally directed to an anti-icing and ultraviolet (UV) reflective apparatus for vehicle windshields and windows. As will be described in greater detail below, the apparatus and system described herein may store a cover sufficiently large enough to protect the entirety of a vehicle's windshields and windows and further coat the cover with an anti-freezing substance to prevent ice from forming during freezing weather via a time efficient application of the cover to a vehicle, thereby preventing objects (such as windshield wipers) from freezing to vehicle glass, facilitating snow removal, and enabling a user to save time when preparing for travel during winter conditions through a direct application of the cover to a vehicle. Additionally or alternatively, one side of the cover may be constructed of a material that is highly reflective to sunlight and utilized to block UV radiation rays from being absorbed by vehicle windshields and windows, thereby keeping vehicle interiors cool and preventing vehicle interior components (e.g., upholstery, liners, and/or other interior surfaces, etc.) from fading and/or breaking down from the UV radiation. Thus, the disclosed apparatus and system may enable individuals, companies, and/or organizations with vehicles parked outside of their homes, company facilities, and event spaces, to quickly and easily prevent the freezing of windshields and windows as well as reflect harmful radiation. In this way, the apparatus and system described herein may overcome drawbacks of traditional solutions that require the time and labor-intensive process of sequentially applying anti-freezing substances to each of a vehicle's windshields and windows and/or applying multiple portable sunshades to protect an entire vehicle against UV radiation.

Embodiments of the disclosure now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
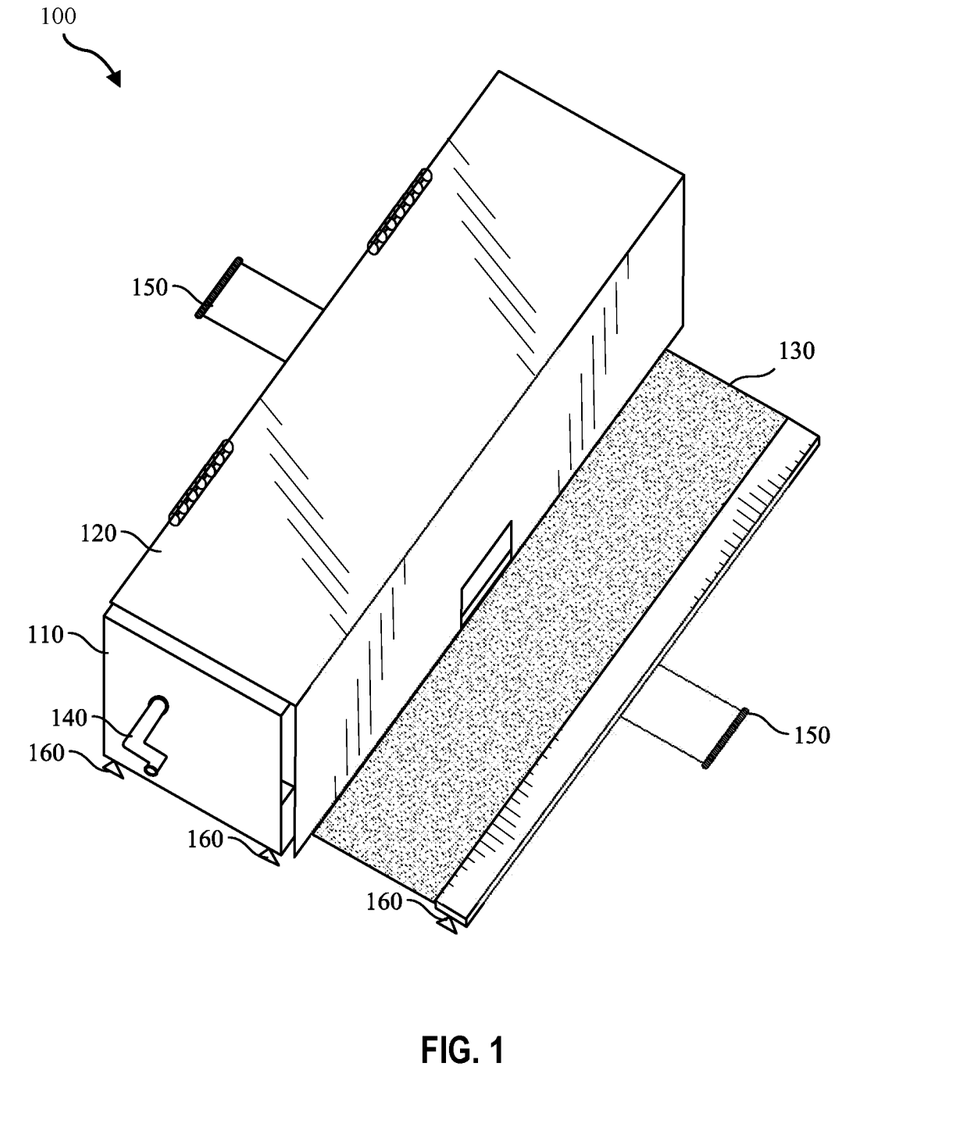
FIG. 1 illustrates a perspective view of an example anti-icing and ultraviolet reflective apparatus for vehicle windshields and windows, according to an example embodiment.

FIG. 1 illustrates an example anti-icing and ultraviolet (UV) reflective apparatus 100 for vehicle windshields and windows (hereinafter "apparatus 100"). Apparatus 100 may include a housing 110. Housing 110 may include a hinged door 120, a cover 130, a turning mechanism 140, security cables 150, and attachment components 160.

In some examples, housing 110 may contain various interior components within hinged door 120, including a portion of cover 130, for use in coating cover 130 with an anti-freezing compound for protecting vehicle windshields and doors against freezing. The various interior components contained in housing 110 will be discussed in greater detail in the description of FIG. 2.

In some embodiments, cover 130 may consist of a sufficient amount of a textile material (e.g., fabric) or other suitable material for covering the entirety of a vehicle's glass surfaces, including the windshield, front side windows, back side windows, and the rear or back window, as well as windshield frames, window frames, and door frames. In some examples, the material on one side of cover 130 may be highly reflective to sunlight to facilitate the reflection of UV radiation, thereby preventing a vehicle interior from fading and breaking down in warm/hot weather conditions while also maintaining cooler temperatures inside of the vehicle.

In some examples, turning mechanism 140, which may be coupled to one or more interior components of housing 110, may be utilized to extend cover 130 from housing 110 onto a vehicle windshield and one or more vehicle windows. In one embodiment, turning mechanism 140 may turned by a user (in either a clockwise or counter-clockwise direction) such that a suitable torque is applied for extending cover 130 from housing 110. In some examples, turning mechanism 140 may be a crank in communication with a cover mechanism for storing cover 130 and utilized to extend a length of cover 130 from housing 110 so as to facilitate a user pulling cover 130 from housing 110. In other examples, a sufficient length of cover 130 may be "pre-extended" from housing 110 such that a user may pull cover 130 for extending cover 130 onto a vehicle windshield and/or windows without utilizing turning mechanism 140.

The term "vehicle" as used herein, generally refers to any machine utilized for transporting people or cargo. Example vehicles may include, without limitation, motor vehicles (e.g., automobiles, motorcycles, trucks, buses, etc.), railed vehicles, watercraft, amphibious vehicles, aircraft and/or spacecraft.

In some examples, security cables 150 may be anti-theft cables utilized to secure apparatus 100 to a vehicle windshield. In some examples, security cables 150 may be secured between a vehicle door frame and a windshield glass frame to assist in holding apparatus 100 and cover 130 in place on a vehicle windshield and further maintain cover 130 on the vehicle windshield and one or more vehicle windows when cover 130 is extended to protect an entire vehicle. In one embodiment, a first security cable 150 may be attached to cover 130 and a second security cable 150 may be attached to a bottom of housing 110.

In some examples, attachment components 160 may be secured to the bottom corners of housing 110 as well as beneath cover 130 on apparatus 100. In one embodiment, attachment components 160 may be suction cups utilized to hold apparatus 100 and cover 130 in place on a vehicle surface (e.g., an automobile windshield), thereby facilitating extending cover 130 over a vehicle windshield and/or one or more vehicle windows. In some embodiments, attachment components 160 may also include other suitable attachment means for holding apparatus 100 and cover 130 in place on a vehicle surface.

Figure 2:
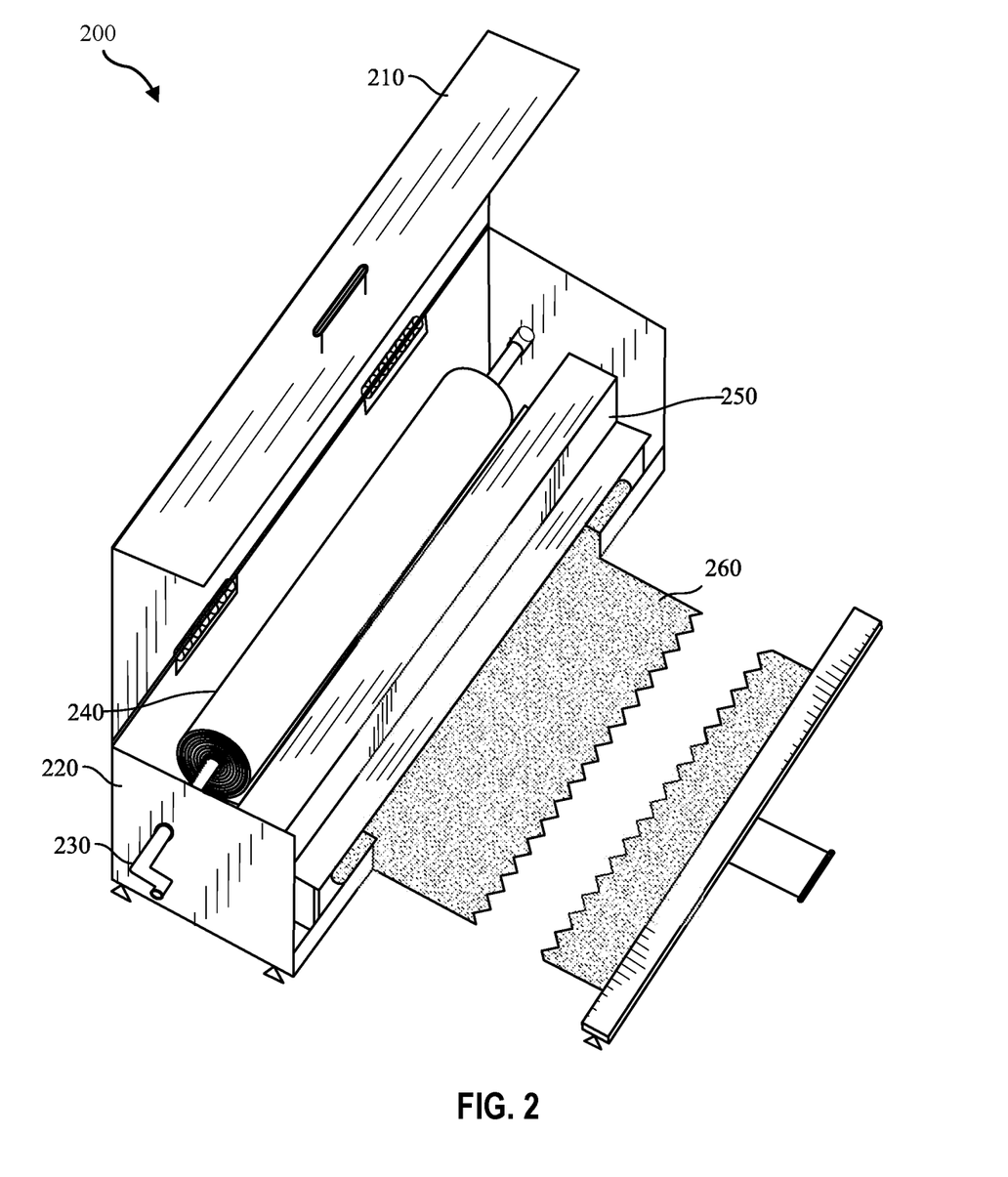
FIG. 2 illustrates a perspective view of interior components contained in an example anti-icing and ultraviolet reflective apparatus for vehicle windshields and windows, according to an example embodiment.

Turning now to FIG. 2, interior components of an example anti-icing and ultraviolet reflective apparatus 200 (hereinafter "apparatus 200") for vehicle windshields and windows are shown. The interior components, which may be located under door 210 of housing 220, may include a cover component 240 and a roller component 250.

In some examples, cover component 240 may include a cover 260 overlapping and rolled over a rod that may be secured between two interior walls of housing 220. Additionally, one end of the rod may further be coupled to turning mechanism 230 such that when a rotational force (e.g., torque) is applied to turning mechanism 230, cover 260 may be extended through rollers contained within roller component 250 for applying an anti-freezing compound stored therein, as will be described in greater detail in the discussion of FIG. 3. In some examples, cover 260 may be extended or pulled over roller component 250 such that cover 260 is not coated with the anti-freezing compound and thus may be utilized as a reflector for UV radiation.

Figure 3:
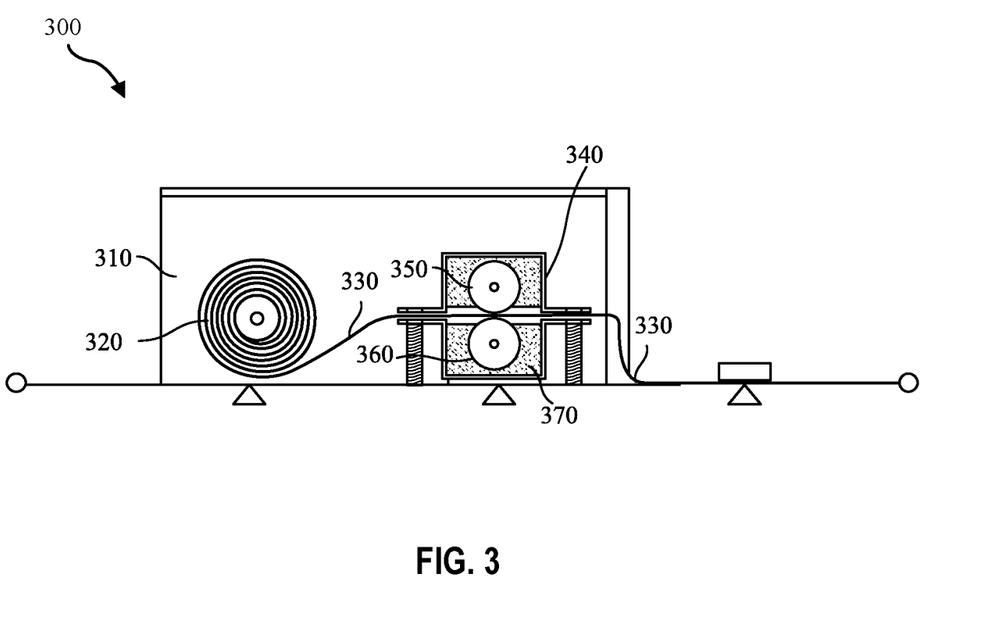
FIG. 3 illustrates a side view of an example anti-icing and ultraviolet reflective apparatus for vehicle windshields and windows showing interior components contained therein, according to an example embodiment.

Turning now to FIG. 3, a side view of interior components of an example anti-icing and ultraviolet reflective apparatus 300 (hereinafter "apparatus 300") for vehicle windshields and windows is shown. The interior components may include a cover component 320 and a roller component 340.

In some examples, cover component 320 may include a cover 330 overlapping and rolled over a rod that may be secured between two interior walls of housing 310. Additionally, one end of the rod may further be coupled to a turning mechanism such that when a rotational force (e.g., torque) is applied to cover component 320, cover 330 may be extended through rollers 350 and 360 contained within roller component 340 for applying (e.g., coating) cover 330 with an anti-freezing compound 370.

In some examples, roller component 340 may be a container storing anti-freezing compound 370 and rollers 350 and 360 may be inserted inside of the container thereby coating rollers 350 and 360 with anti-freezing compound 370. In one example, roller 350 (e.g., the top roller) may be inserted in a top half of the container holding anti-freezing compound 370 and roller 360 (e.g., the bottom roller) may be inserted in a bottom half of the container holding the anti-freezing compound 370, thereby coating both rollers 350 and 360. In one example, rollers 350 and 360 may include fibers for facilitating saturating rollers 350 and 360 the anti-freezing compound 370. In some examples, cover 330 may be extended into roller component 340 such that cover 330 may be pulled between rollers 350 and 360 to simultaneously coat both the bottom and top sides of cover 330 with a thin layer of anti-freezing compound 370 as cover 330 is being pulled. In one embodiment, cover 330 may be extended or pulled over the top of roller component 340 such that cover 330 is not coated with anti-freezing compound 370 and thus may be utilized as a reflector for UV radiation. In this embodiment, at least one side of cover 330 may be constructed of a material that is highly reflective to sunlight thereby facilitating the reflection of the UV radiation.

The term "anti-freezing compound" as used herein, generally refers to any chemical substance having a low-freezing point. Example anti-freezing compounds may include, without limitation, oils, grease, cooking lubricants or chemical jellies (e.g., petroleum jelly). For example, petroleum jelly will not freeze above temperatures of −100 degrees Fahrenheit or −73 degrees Celsius.

Figure 4:
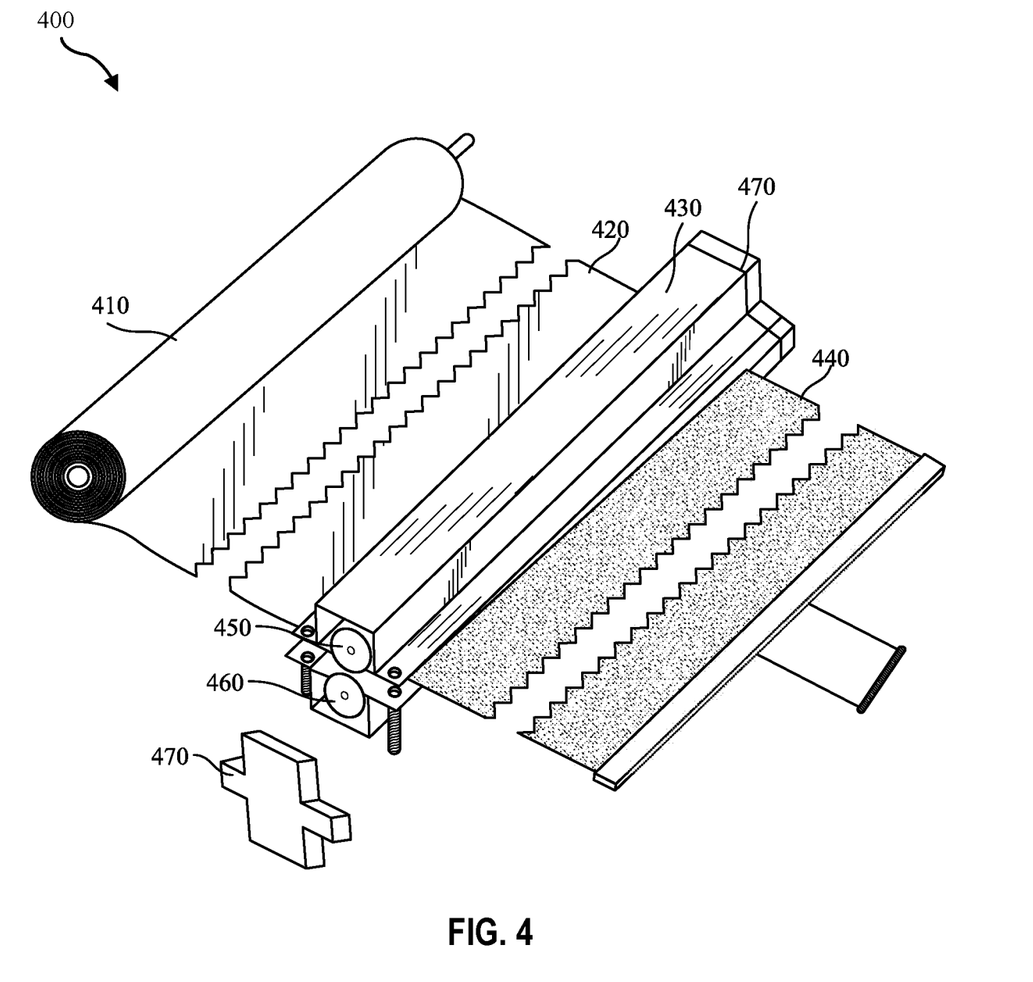
FIG. 4 illustrates a perspective view of a cover and a roller component storing rollers in a container for storing an anti-freezing compound in the example anti-icing and ultraviolet reflective apparatus for vehicle windshields, according to an example embodiment.

Turning now to FIG. 4, components 400 contained within an example anti-icing and ultraviolet reflective apparatus for vehicle windshields and windows are shown. Components 400 may include a cover component 410, a roller component 430, and end caps 470.

In some examples, cover component 410 may include a cover 420 overlapping and rolled over a rod such that when a rotational force (e.g., torque) is applied to cover component 410, cover 420 may be extended through rollers 450 and 460 contained within roller component 430 for applying (e.g., coating) cover 420 with an anti-freezing compound as shown by the shading on coated cover 440 (i.e., coated cover 440 represents cover 420 after an anti-freezing compound has been applied by rollers 450 and 460). In some examples, cover 420 may contain a previously applied anti-freezing compound prior to being installed on cover component 410. For example, an additional anti-freezing compound such as a cooking lubricant or a penetrating oil and water-displacing substance (e.g., the WD-4 penetrating oil and water-displacing spray) may be sprayed. In this example, the additional anti-freezing substance may be sprayed on cover 420 prior to cover 420 being coated with the anti-freezing substance stored in rolling component 430. In some examples, end caps 470 may be utilized to cover the sides of roller component 430 to facilitate holding an anti-freezing compound therein.

Figure 5:
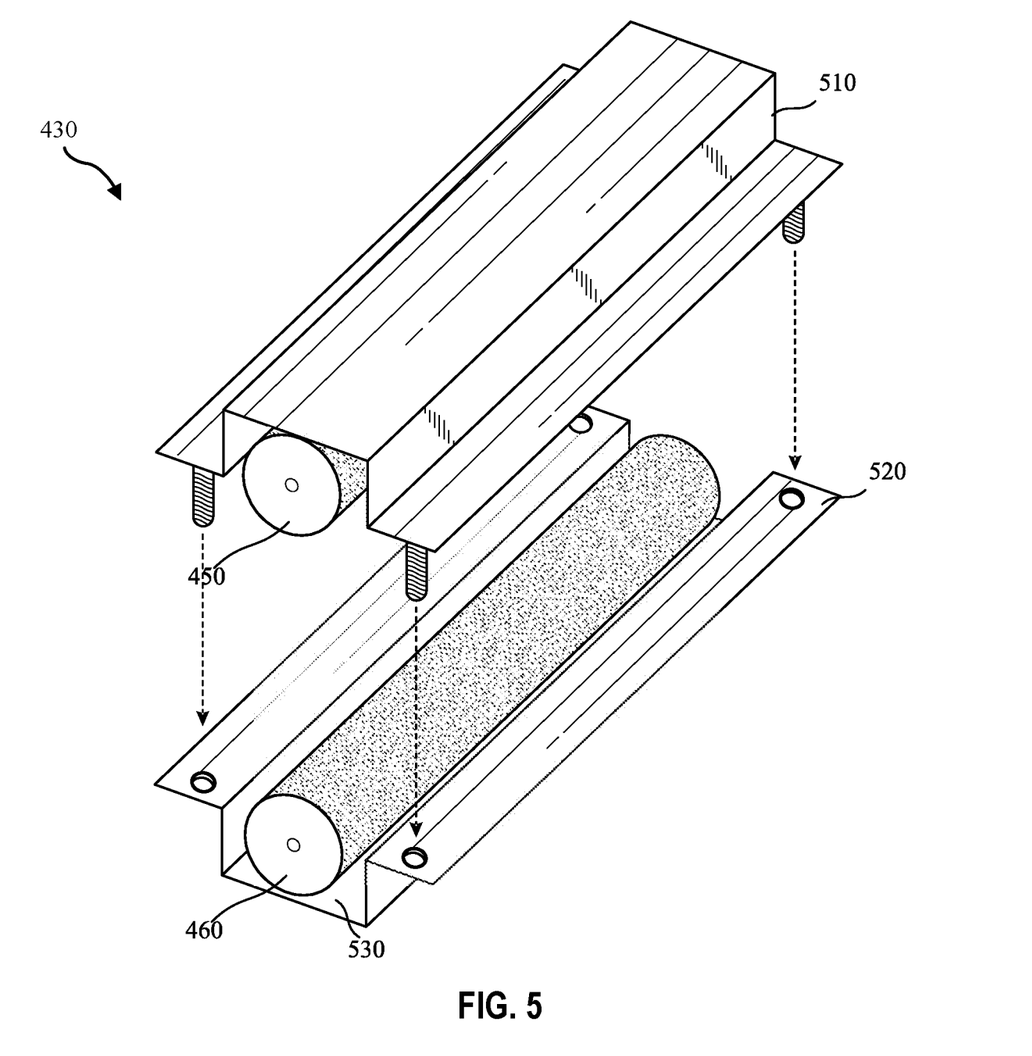
FIG. 5 illustrates an exploded view of the roller component of FIG. 4 showing rollers utilized for applying an anti-freezing compound, according to an example embodiment.

FIG. 5 illustrates an exploded view of roller component 430 in FIG. 4. In some examples, roller component 430 may include a container split into two portions, a top container portion 510 and a bottom container portion 520. Top container portion 510 may house a roller 450 for coating cover 420 (e.g., a top side of cover 420) shown in FIG. 4. Similarly, bottom container portion 520 may house a roller 460 for coating cover 420 (e.g., a bottom side of cover 420) shown in FIG. 4. Additionally, one or both of top container portion 510 and bottom container portion 520 may store anti-freezing substance 530 utilized for saturating rollers 450 and 460. Additionally, top container portion 510 may also include a set of screws for securing top container portion 510 to screw holes contained in bottom container portion 520 thereby forming roller component 430.

Figure 6:
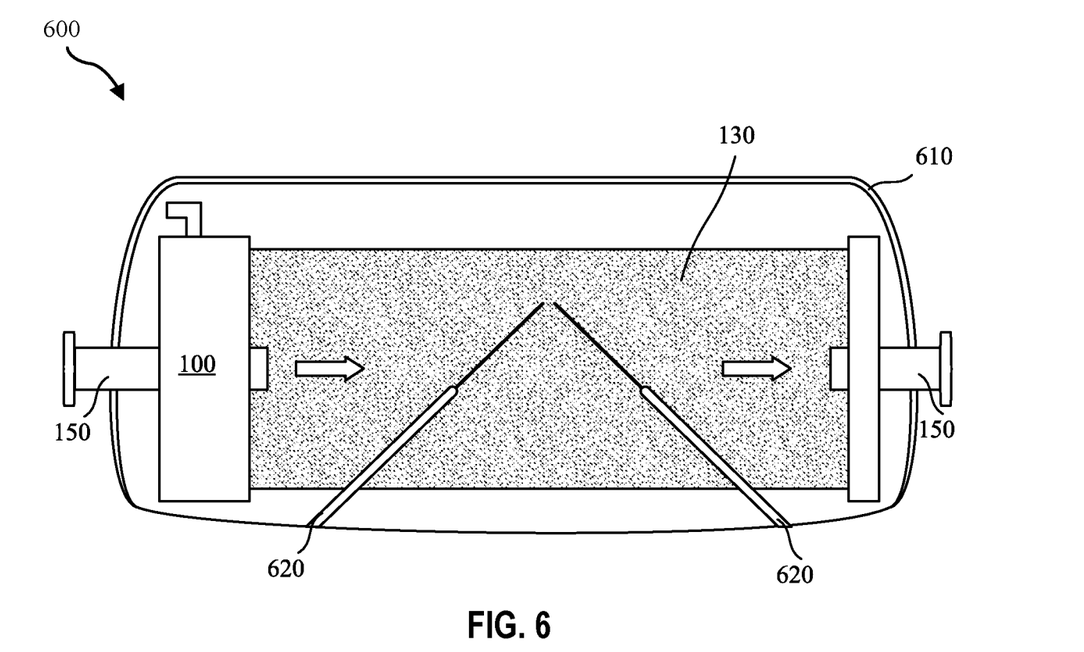
FIG. 6 illustrates a front view of an example anti-icing and ultraviolet reflective system, according to an example embodiment.

FIG. 6 illustrates a front view of an example anti-icing and ultraviolet reflective system 600 (hereinafter "system 600"). In some embodiments, system 600 may include apparatus 100 (discussed above in the description of FIG. 1) coupled to a vehicle windshield 610 via security cables 150. In some examples, security cables 150 may be attached between the vehicle windshield frame containing vehicle windshield 610 and a vehicle door frame (not shown) to secure one end of apparatus 100 and cover 130 to vehicle windshield 610. In addition, the bottom of apparatus 100 may further be coupled to vehicle windshield 610 via one or more attachment components (not shown) such as suction cups.

As shown in FIG. 6, cover 130 is extended (e.g., pulled) from apparatus 100 to cover vehicle windshield 610. In some examples, cover 130 may be extended so that cover 130 passes under wipers 620 (e.g., wipers 620 may be set or laid on top of cover 130) so as to prevent wipers 620 from freezing to vehicle windshield glass when cover 130 is coated with an anti-freezing compound and applied to vehicle windshield 610 to protect against freezing.

As discussed above, in some examples, cover 130 may be coated with an anti-freezing compound when it is pulled from apparatus 100 to cover vehicle windshield 610, as described above with respect to FIG. 1. In other examples, cover 130 may not be coated with the anti-freezing compound thereby allowing cover 130 to be utilized to reflect UV radiation. For example, as discussed in FIG. 1, the material on one side of cover 130 (e.g., the side facing away from vehicle windshield 610) may be highly reflective to sunlight and thereby reflect UV radiation.

Figure 7:
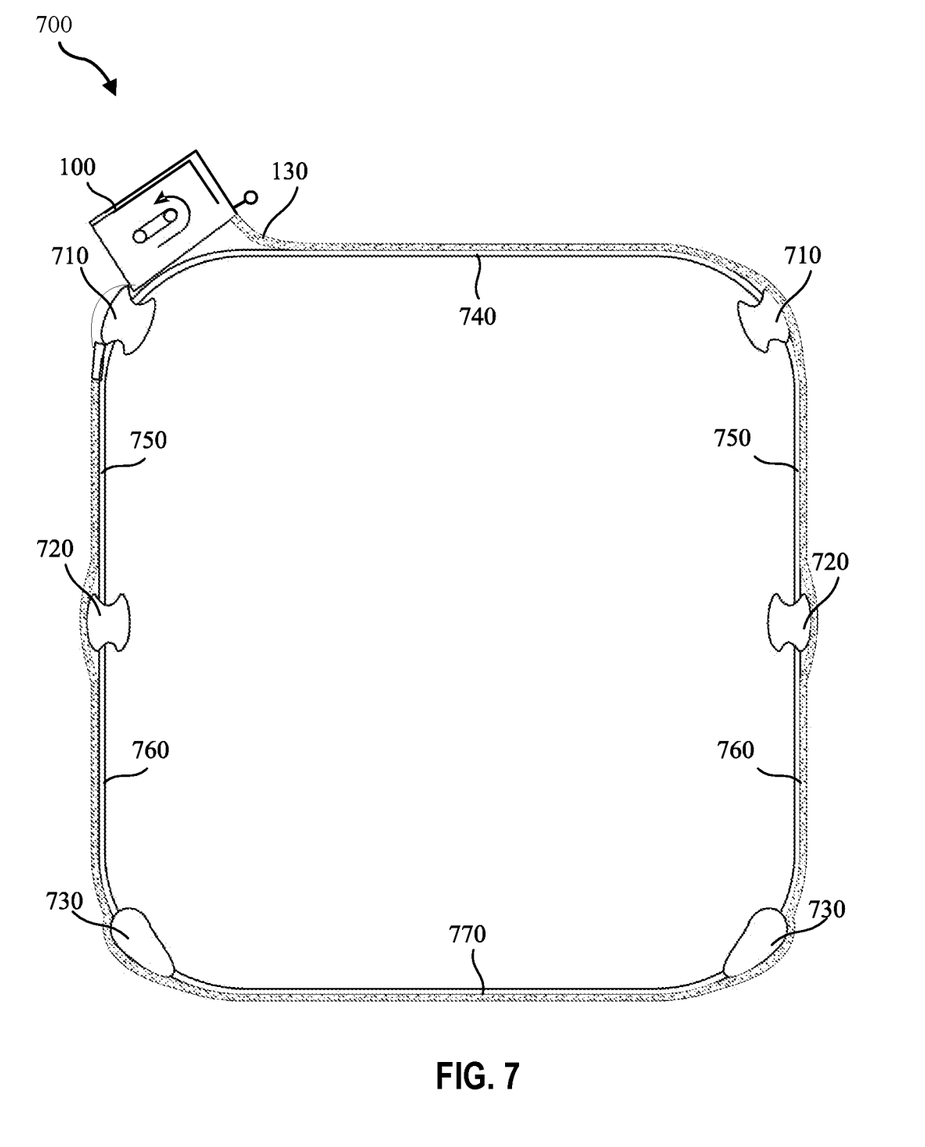
FIG. 7 illustrates a top view of an example anti-icing and ultraviolet reflective system, according to an example embodiment.

FIG. 7 illustrates a top view of an example anti-icing and ultraviolet reflective system 700 (hereinafter "system 700"). In some embodiments, system 700 may include apparatus 100 (discussed above in the description of FIG. 1) and a vehicle including left and right windshield frames 710, left and right door frames 720, left and right rear window frames 730, windshield 740, left and right front windows 750, left and right rear windows 760, and rear window 770. In some examples, apparatus 100 may be coupled to windshield 740 utilizing one or more security cables of apparatus 100 as discussed above.

As shown in FIG. 7, in some embodiments, cover 130 from apparatus 100 may be pulled by a user to protect the entirety of a vehicle's windshield and windows against freezing and/or UV radiation. In some embodiments, cover 130 may be coated on both sides with an anti-freezing substance (e.g., petroleum jelly) by apparatus 100 and may be pulled by the user around the entirety of the vehicle to protect windshield 740, left and right front windows 750, left and right rear windows 760, and rear window 770 against freezing. In other embodiments, cover 130 may not be coated with an anti-freezing substance by apparatus 100 and include a highly reflective surface (facing away from the vehicle) such that when cover 130 is pulled by the user around the entirety of the vehicle, windshield 740, left and right front windows 750, left and right rear windows 760, and rear window 770 are protected against UV radiation. In some examples, a user may pull cover 130 to wrap around the vehicle in a single 360 degree turn to protect windshield 740, left and right front windows 750, left and right rear windows 760, and rear window 770 on the vehicle against freezing or UV radiation, as desired.

In some embodiments, a method for manufacturing, assembling, using, adjusting, or otherwise configuring or creating the manufacturing, assembling, using, adjusting, or otherwise configuring or creating an anti-icing and ultraviolet (UV) reflective apparatus for vehicle windshields and windows. For example, a method may include (1) coupling a cover component to an interior of a housing, where the housing includes a hinged door for at least partially covering a set of interior components and wherein the cover component stores a cover for covering a vehicle windshield and/or one or more vehicle windows, (2) coupling a roller component to the interior of the housing, where the roller component stores a set of rollers in an anti-freezing compound, and (3) coupling a turning mechanism to the cover component through an exterior side of the housing, where the turning mechanism, in response to an applied torque, extends the cover from the cover component onto the vehicle windshield and/or vehicle windows to protect against freezing and UV radiation. In some embodiments, the method may further include (4) coupling set of security cables to the cover and the bottom of the housing for attachment between one or more vehicle door frames and a vehicle windshield frame, where the security cable maintains the cover in place on the vehicle windshield/and or one or more vehicle windows and (5) coupling multiple attachment components to a bottom of the housing for affixing the housing to the vehicle windshield or vehicle windows.

As discussed throughout the instant disclosure, the disclosed apparatus, systems, and methods may provide a number of advantages over traditional solutions for protecting vehicle windshields and windows from freezing and/or UV radiation. For example, the disclosed apparatus, systems, and methods may (1) prevent ice from forming on a vehicle windshields and windows during freezing weather, (2) block UV radiation thereby keeping vehicle interiors cooler preventing interior surfaces from fading and breaking down, (3) provide for simple and rapid installation into a vehicle frame thereby saving users the time required for scraping ice from vehicle windshields and windows in freezing weather when traveling (e.g., going to/leaving from work) during winter conditions, (4) provide for the use of anti-freezing substances (e.g., a non-corrosive substance such as petroleum jelly) that may be purchased locally in any supermarket or drug store, (5) provide for easy cleaning of external and/or internal components, (6) enable easy transport and storage due to portability associated with the apparatus, (7) facilitate snow and ice removal from vehicle windshields and windows, (8) prevent vehicle windshield wipers from freezing to underlying glass, (9) adaptable to fit any vehicle windshield and windows, (10) provide integrated anti-theft cables, and (11) provide a cover capable of wrapping around a windshield and all of the windows of a vehicle in a single 360 degree turn, The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. An anti-icing and ultra-violet (UV) reflective apparatus for vehicle windshields and windows comprising:
  a housing comprising a hinged door that at least partially covers a plurality of interior components contained therein;

a cover component coupled to an interior of the housing that stores a cover for covering at least one of a vehicle windshield and one or more vehicle windows;

a roller component, coupled to an interior of the housing, that stores a plurality of rollers in an anti-freezing compound; and a turning mechanism coupled to the cover component through an exterior side of the housing that extends, in response to an applied torque, the cover from the cover component onto the at least one of the vehicle windshield and the one or more vehicle windows to protect the at least one of the vehicle windshield and the one or more vehicle windows against freezing and UV radiation.

2. The anti-icing and UV reflective apparatus of claim 1, wherein the turning mechanism extends the cover from the cover component onto the at least one of the vehicle windshield and the one or more vehicle windows by:

extending the cover from the cover component through the rollers in the roller component to coat the cover with the anti-freezing compound; and extending the cover coated with the anti-freezing compound from the roller component onto the at least one of the vehicle windshield and the one or more vehicle windows to protect the at least one of the vehicle windshield and the one or more vehicle windows against freezing.

3. The anti-icing and UV reflective apparatus of claim 2, wherein extending the cover from the cover component through the rollers in the roller component to coat the cover with the anti-freezing compound comprises extending the cover between a top roller and a bottom roller to simultaneously coat a top side and a bottom side of the cover with the anti-freezing compound.

4. The anti-icing and UV reflective apparatus of claim 1, wherein the turning mechanism extends the cover from the cover component onto the at least one of the vehicle windshield and the one or more vehicle windows by extending the cover from the cover component over the roller component and onto the at least one of the vehicle windshield and the one or more vehicle windows to protect the at least one of the vehicle windshield and the one or more vehicle windows against the UV radiation.

5. The anti-icing and UV reflective apparatus of claim 4, wherein the cover comprises at least one side that reflects the UV radiation.

6. The anti-icing and UV reflective apparatus of claim 1, further comprising a plurality of security cables that attach between at least one vehicle door frame and a vehicle windshield frame, wherein the security cables maintain the cover in place on the at least one of the vehicle windshield and the one or more vehicle windows.

7. The anti-icing and UV reflective apparatus of claim 6, wherein the security cables comprise a first security cable coupled to the cover and a second security cable coupled to a bottom of the housing.

8. The anti-icing and UV reflective apparatus of claim 1, further comprising a plurality of attachment components that affix the anti-icing and UV reflective apparatus to at least one the vehicle windshield and the one or more vehicle windows.

9. The anti-icing and UV reflective apparatus of claim 1, wherein the anti-freezing compound comprises a chemical substance having a low freezing point.

10. A system comprising:
a vehicle comprising at least one of a windshield and one or more windows; and an anti-icing and ultra-violet (UV) reflective apparatus coupled to the at least one of the windshield and the windows, the apparatus comprising:

a housing comprising a hinged door that at least partially covers a plurality of interior components contained therein;

a cover component coupled to an interior of the housing that stores a cover for covering the at least one of the windshield and the windows;

a roller component, coupled to an interior of the housing, that stores a plurality of rollers in an anti-freezing compound; and a turning mechanism coupled to the cover component through an exterior side of the housing that extends, in response to an applied torque, the cover from the cover component onto the at least one of the windshield and the windows to protect against freezing and UV radiation.

11. The system of claim 10, wherein the turning mechanism extends the cover from the cover component onto the at least one of the windshield and the windows by:

extending the cover from the cover component through the rollers in the roller component to coat the cover with the anti-freezing compound; and extending the cover coated with the anti-freezing compound from the roller component onto the at least one of the windshield and the windows to protect against freezing.

12. The system of claim 11, wherein extending the cover from the cover component through the rollers in the roller component to coat the cover with the anti-freezing compound comprises extending the cover between a top roller and a bottom roller to simultaneously coat a top side and a bottom side of the cover with the anti-freezing compound.

13. The system of claim 10, wherein the turning mechanism extends the cover from the cover component onto the at least one of the windshield and the windows by extending the cover from the cover component over the roller component and onto the at least one of the windshield and the windows to protect against the UV radiation.

14. The system of claim 13, wherein the cover comprises at least one side that reflects the UV radiation.

15. The system of claim 10, further comprising a plurality of security cables that attaches between at least one door frame and a windshield frame on the vehicle, wherein the security cables maintain the cover in place when it covers the at least one of the windshield and the windows.

16. The system of claim 15, wherein the security cables comprise a first security cable coupled to the cover and a second security cable coupled to a bottom of the housing.

17. The system of claim 10, further comprising a plurality of attachment components coupled to the apparatus that affix the apparatus to at least one of the windshield and the windows.

18. The system of claim 10, wherein the anti-freezing compound comprises a chemical substance having a low freezing point.

19. A method comprising:
coupling a cover component to an interior of a housing, wherein the housing comprises a hinged door for at least partially covering a plurality of interior components and wherein the cover component stores a cover for covering at least one of a vehicle windshield and one or more vehicle windows;

coupling a roller component to the interior of the housing, wherein the roller component stores a plurality of rollers in an anti-freezing compound; and coupling a turning mechanism to the cover component through an exterior side of the housing, wherein the turning mechanism, in response to an applied torque, extends the cover from the cover component onto the at least one of the vehicle windshield and the one or more vehicle windows to protect the at least one of the vehicle windshield and the one or more vehicle windows against freezing and UV radiation.

20. The method of claim 19, further comprising:

coupling a plurality of security cables to the cover and a bottom of the housing for attachment between at least one vehicle door frame and a vehicle windshield frame, wherein the security cables maintain the cover in place on the at least one of the vehicle windshield and the one or more vehicle windows; and coupling a plurality of attachment components to the bottom of the housing for affixing the housing to at least one of the vehicle windshield and the vehicle windows.

\* \* \* \* \*